United States Patent
Iwase et al.

(10) Patent No.: US 6,879,151 B2
(45) Date of Patent: Apr. 12, 2005

(54) ROTATION DETECTION SENSOR AND METHOD FOR MANUFACTURING A ROTATION DETECTION SENSOR

(75) Inventors: Eiichiro Iwase, Toyoake (JP); Toshiyuki Matsuo, Takahama (JP)

(73) Assignees: Aisin Seiki Kabushiki Kaisha, Kariya (JP); Aisin AW Co., Ltd., Anjo (JP)

( * ) Notice: Subject to any disclaimer, the term of this patent is extended or adjusted under 35 U.S.C. 154(b) by 251 days.

(21) Appl. No.: 10/175,858

(22) Filed: Jun. 21, 2002

(65) Prior Publication Data
US 2002/0196014 A1 Dec. 26, 2002

(30) Foreign Application Priority Data

Jun. 21, 2001 (JP) ........................................ 2001-188801

(51) Int. Cl.[7] .............................................. G01B 7/30
(52) U.S. Cl. .................................. 324/207.25; 324/260
(58) Field of Search ........................ 324/207.11–207.18, 324/207.2, 207.22, 207.23, 207.24, 207.25, 160, 260–261; 174/52.1, 52.2, 52.3, 52.4

(56) References Cited

U.S. PATENT DOCUMENTS 5,250,925 A * 10/1993 Shinkle .................... 338/32 R
6,054,850 A * 4/2000 Hayashi et al. ............. 324/174

FOREIGN PATENT DOCUMENTS

JP        2000-310646 A        11/2000

* cited by examiner

Primary Examiner—Bot LeDynh
(74) Attorney, Agent, or Firm—Burns, Doane, Swecker & Mathis, L.L.P.

(57) ABSTRACT

A rotation detection sensor for inhibiting the invasion of high temperature and high pressure fluid includes a holder, a detection element, a case body, and a housing. The tip end portion of the holder at which is located the detection element is accommodated in the case body and the rear end portion of the holder is covered by the housing. A first groove accommodating a first O-ring is formed on the external peripheral surface of the holder, and a second groove accommodating a second O-ring is formed on the external peripheral surface of the holder toward the tip end side relative to the first groove. A method for forming the sensor involves positioning the case body and the holder in a recess portion of a die, and injecting resin into the die to form the housing covering the rear end portion of the holder.

16 Claims, 9 Drawing Sheets

ROTATION DETECTION SENSOR AND METHOD FOR MANUFACTURING A ROTATION DETECTION SENSOR

This application is based on and claims priority under 35 U.S.C. §119 with respect to Japanese Application No. 2001-188801 filed on Jun. 21, 2001, the entire content of which is incorporated herein by reference.

FIELD OF THE INVENTION

The present invention generally relates to a rotation detection sensor. More particularly, the present invention pertains to a sealing structure and a configuration for the sealing structure of a rotation detection sensor, as well as a method for manufacturing a rotation detection sensor.

BACKGROUND OF THE INVENTION

A known rotation detection sensor is disclosed in Japanese Patent Laid-Open Publication No. 2000-310646. This rotation detection sensor includes a holder accommodated in a case body having a bottom. The holder has a sensor and electronic parts, and is provided with a terminal by insert forming. A housing having a connector and an external peripheral groove extending in a circumferential direction of the case body is formed in a unitary manner on the case body. A welding portion provided on the case body during the molding process is welded when post forming the housing to maintain the sealing performance. This sealing prevents the oil in the housing, which accommodates a rotation member, from leaking to the connector side.

Another rotation detection sensor is also disclosed in Japanese Patent Laid-Open Publication No. 2000-310646. In this rotation detection sensor, in addition to the sealing provided by welding the welding portion upon post forming the housing, an additional sealing function relative to the case body is provided on the holder side. A groove is formed on the external periphery of the holder and a sealing member such as an O-ring is provided in the groove. Furthermore, a recess portion is provided on a holder in which the terminal extends in the longitudinal direction. By applying resin potting or fitting a rubber bush in the recess portion, the sealing of the recess portion is performed. Thus, a double sealing construction is provided relative to the sensor.

In the case of the first rotation detection sensor mentioned above and described in Japanese Patent Laid-Open Publication No. 2000-310646, because the welding portion is positioned on the rotation member side relative to the sealing member provided on the external peripheral groove, the case body is compressed by the pulsing hydraulic pressure under the installing condition in which the oil with high temperature and high pressure affects a tip portion of the rotation detection sensor. Thus, a drawback exists in that the welding portion may be destroyed by the stress applied to the welding portion, and this can cause oil to invade into the sensor.

In the case of the second rotation detection sensor mentioned above and described in Japanese Patent Laid-Open Publication No. 2000-310646, the invasion of oil into the sensor (i.e., the Hall IC accommodation space) is prevented in some respects by the sealing member provided at the recess portion formed on the holder. Notwithstanding this, because the sealing between the holder and the terminal is performed by resin potting, a drawback exists in that the attachment surface of the potting may peel off from the terminal due to the pulsating oil which is under high temperature and high pressure. This can cause the infiltration of oil into the sensor via a clearance between the terminal and the holder.

With the known rotation detection sensors mentioned above and described in Japanese Patent Laid-Open Publication No. 2000-310646, it is necessary to increase to some extent the resin pressure during pouring of the resin into the die for resin forming to prevent defective molding of the resin such as underfilling during post forming of the housing of the rotation detection sensor. However, because the resin pressure is applied to the rear end surface of the holder, the holder is compressed toward the detection element side. This can cause defects such as the deformation of the case body.

Additionally, in the aforementioned known rotation detection sensors mentioned above, the case body and the housing are fixed by supplying the resin for the housing to a stopper portion provided on the body case. Because the stopper portion is thin-walled and corresponds to the final destination of the resin, it is necessary to maximally increase the resin pressure at the post forming of the housing. However, with the second rotation detection sensor mentioned above, because the sealing member is positioned inside the position on which the stopper portion is provided, the forming resin pressure deforms the internal diameter of the case not to ensure a squeezing of the sealing member, and this is apt to cause a sealing defect.

A need thus exists for a rotation detection sensor whose tip portion is exposed to the high temperature and high pressure fluid and which is able to inhibit or prevent the invasion of the fluid therein.

SUMMARY OF THE INVENTION

A rotation detection sensor to be installed in a predetermined member which accommodates high pressure fluid for detecting rotation of a rotation member positioned in the predetermined member includes a detection element for detecting rotation of the rotation member, a holder having a front end portion including a tip end provided with the detection element, a rear end portion, and an intermediate portion, a first groove formed on an external peripheral surface of the middle portion of the holder, a case body accommodating the front end portion of the holder including the detection element, a housing covering a part of the rear end portion of the holder, and a first sealing member provided in the first groove of the holder.

Another aspect of the invention relates to a method of forming a rotation detection sensor that detects rotation of a rotation member. The method involves positioning a case body and a holder in a recess portion of a die, with the holder having a front end portion, a rear end portion and an intermediate portion located between the front end portion and the rear end portion. The front end portion of the holder includes a tip end at which is located a detection element, and the front end portion of the holder including the detection element is located in the case body. The holder includes an outer peripheral surface at which is provided a first groove, and a first sealing member is positioned in the first groove. The method also includes injecting resin into the die to form a housing covering at least a part of the rear end portion of the holder.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
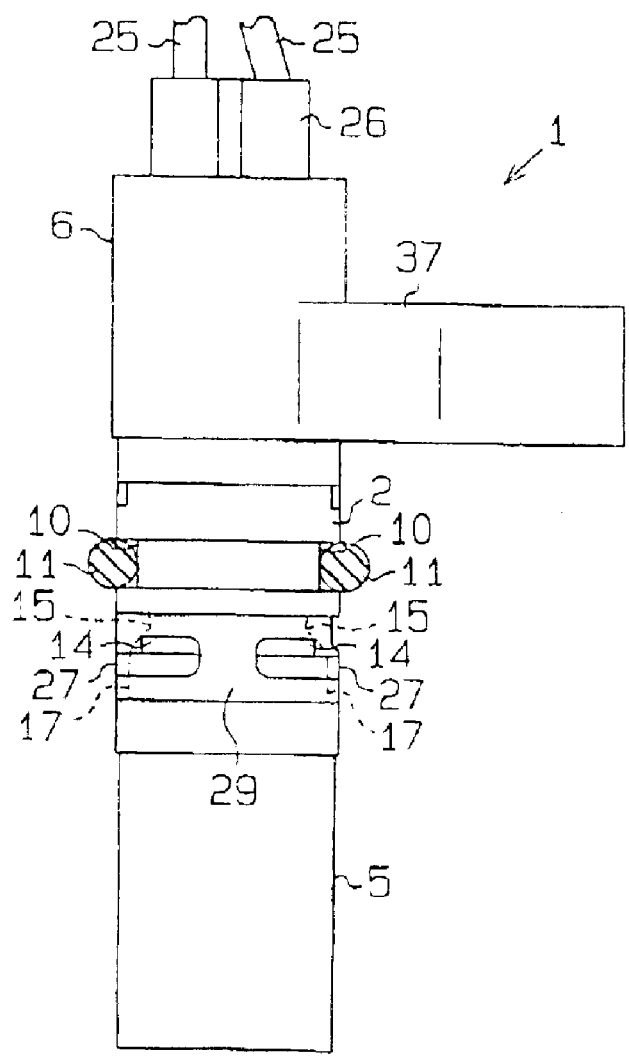
FIG. 1 is a front view of a rotation detection sensor according to an embodiment of the present invention.

One embodiment of a rotation detection sensor will be explained with reference to the illustrations in the drawing figures. Referring to the illustrations in FIGS. 1–5, 7 and 8, the rotation detection sensor 1 includes a holder 2, a terminal 3, a magnetic detection element 4, a case body 5, and a housing 6. For explanatory purposes, the bottom end of the sensor illustrated in the drawing figures represents the tip end of the sensor while the top end of the sensor shown in the drawing figures represents the rear end of the sensor.

The holder 2 is made of resin (i.e., PPS) and is formed to possess an approximately cylindrical shape. The tip end portion and the rear end portion of the holder 2 are contracted or reduced in diameter in the radial direction, with the tip end portion being accommodated in the case body 5 and the rear end potion being covered by the housing 6.

As illustrated in FIGS. 2, 3, 7 and 8, a circumferentially extending annular shaped first groove 10 is positioned at approximately the central portion of the cylindrical outer surface of the holder 2 with respect to the axial length of the holder. A first O-ring 11 serving as a first sealing member is fitted into the first groove 10 for performing the external sealing. The first groove 10 is formed so that the external or outer diameter of the first O-ring 11 fitted into the first groove 10 is greater than the external or outer diameter of the holder 2 on either axial side of the groove 10.

An inserting portion 12 is provided at the tip end side of the holder 2 and is inserted into the case body 5. The internal diameter of the case body 5 is slightly greater than the outer diameter of the inserting potion 12 of the holder 2 so that the inserting portion 12 can be inserted into or positioned in the inserting portion 12.

Figure 3:
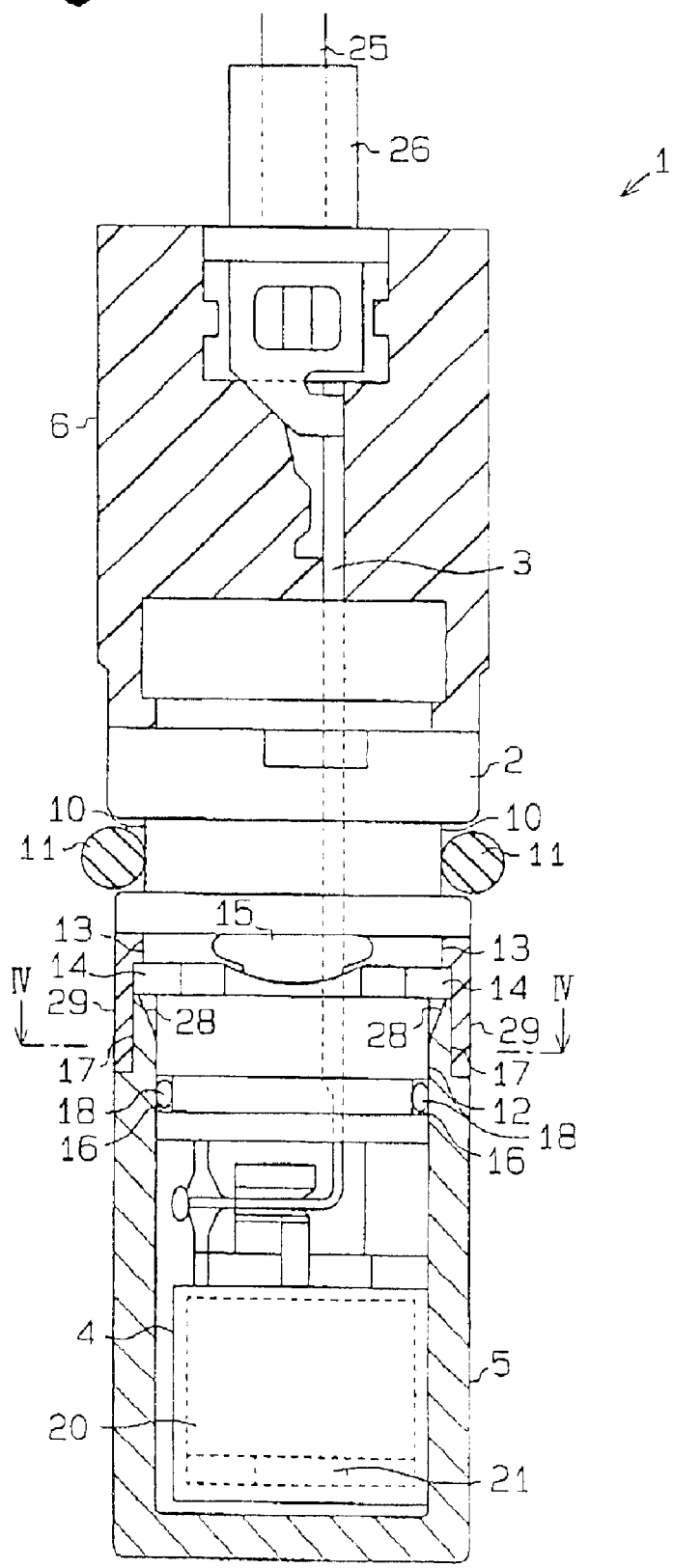
FIG. 3 is a lateral cross-sectional view of the rotation detection sensor shown in FIG. 1.
Figure 7:
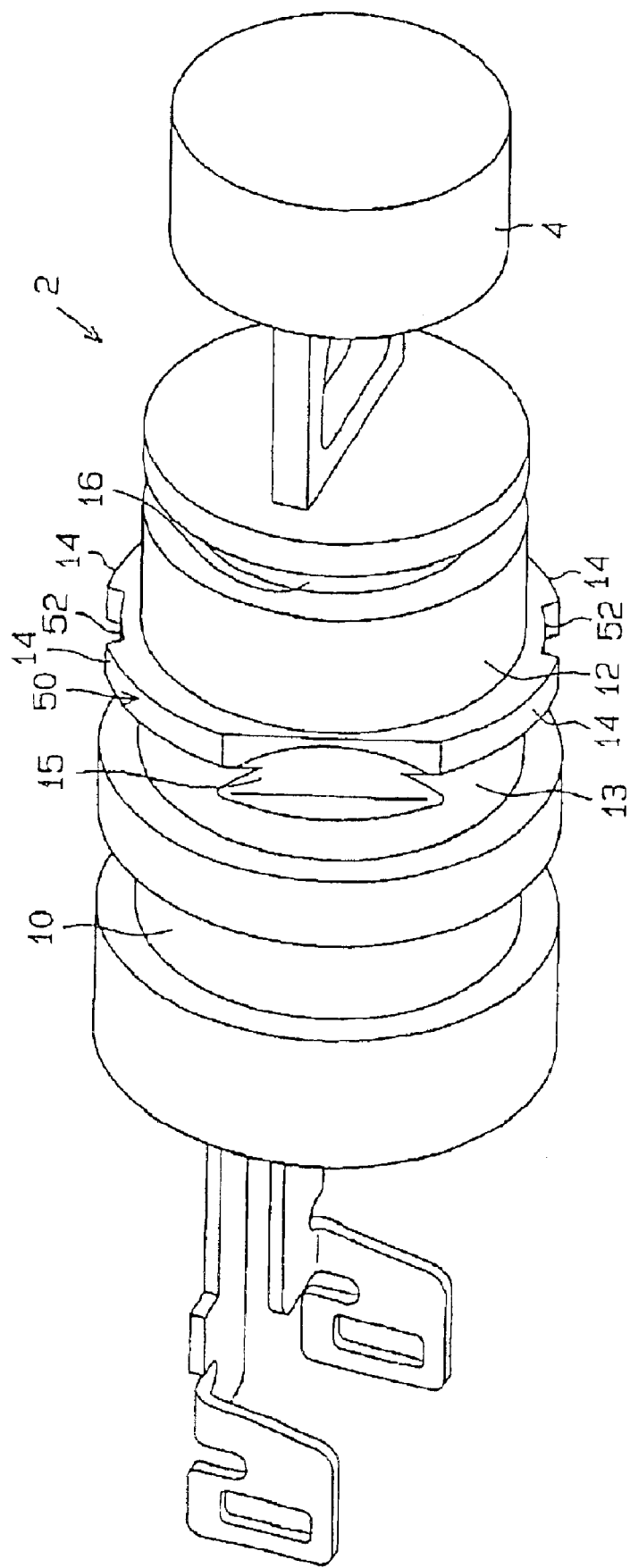
FIG. 7 is a perspective view of the holder and magnetic detection element forming a part of the rotation detection sensor illustrated in FIG. 1.
Figure 8:
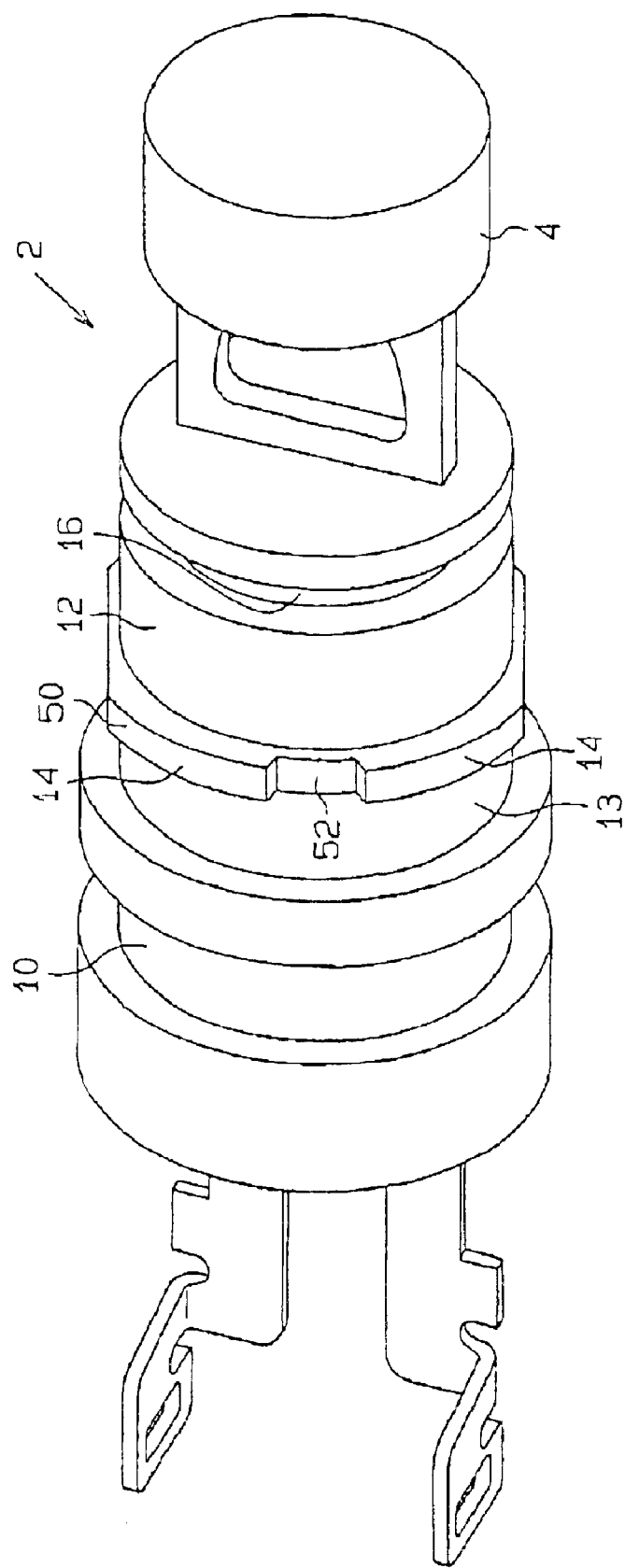
FIG. 8 is a perspective view similar to FIG. 7 illustrating the holder and magnetic detection element, but with the holder and magnetic detection element rotated approximately 90° from the illustration in FIG. 7.

As depicted in FIGS. 3, 7 and 8, an annular circumferentially extending holder recess portion 13 is formed on the peripheral surface of the holder 2 at a position between the first groove 10 and the inserting portion 12 on the cylindrical surface of the holder 2. Thus, an annular circumferentially extending projection portion 50 is provided on the holder 2 at a position between the holder recess portion 13 and the inserting portion 12 (i.e., the tip end side relative to the holder recess portion 13). The projection portion 50 includes internal or inwardly directed recesses 52 spaced apart at a predetermined interval in the peripheral direction to form a plurality of holder projection portions 14. The illustrated embodiment includes four holder projection portions 14.

A plurality of inclines or inclined surface portions 15 are formed between the recesses 52 of the holder 2 and the bottom portion of the holder recess portion 13. In this embodiment, two tapered inclines or inclined surface portions 15 are formed at diametrically opposite positions along the peripheral surface. The inclines 15 are formed internally to be deeper than the bottom portion of the holder recess portion 13. In other words, the depth of the deepest portion of the inclines 15 (i.e., the distance in the radial direction from the most external periphery of the holder 2) are formed deeper than the depth of the holder recess portion 13.

An annular circumferentially extending second groove 16 is formed at the tip end portion of the holder 2. The second groove 16 is formed on the tip end side relative to a case body recess portion 17 provided on the case body 5. Thus, the second groove is not aligned with the case body recess portion 17 in the axial direction (i.e., the top to bottom direction of FIGS. 1–3).

A second O-ring 18 serving as a second sealing member for performing internal sealing is fitted into the second groove 16. The second groove 16 is configured so that the external or outer diameter of the second O-ring 18 as it is fitted into the second groove 16 is greater than the external or outer diameter of the inserting portion 12 on either side of the second O-ring 18. In addition, the external or outer diameter of the second O-ring 18 is greater than the internal diameter of the case body 5.

The magnetic detection element 4 is provided at the tip end of the holder 2. The magnetic detection element 4 includes a magnet 20 for generating magnetic flux and a detection element 21 having Hall IC elements which are formed in a unitary manner at the magnet detection element 4. The terminal 3 including one end portion which is perpendicularly bent is inserted into the holder 2. The magnetic detection element 4 is fixed to the tip end portion of the terminal 3 via soldering so that they are electrically connected.

Figure 5:
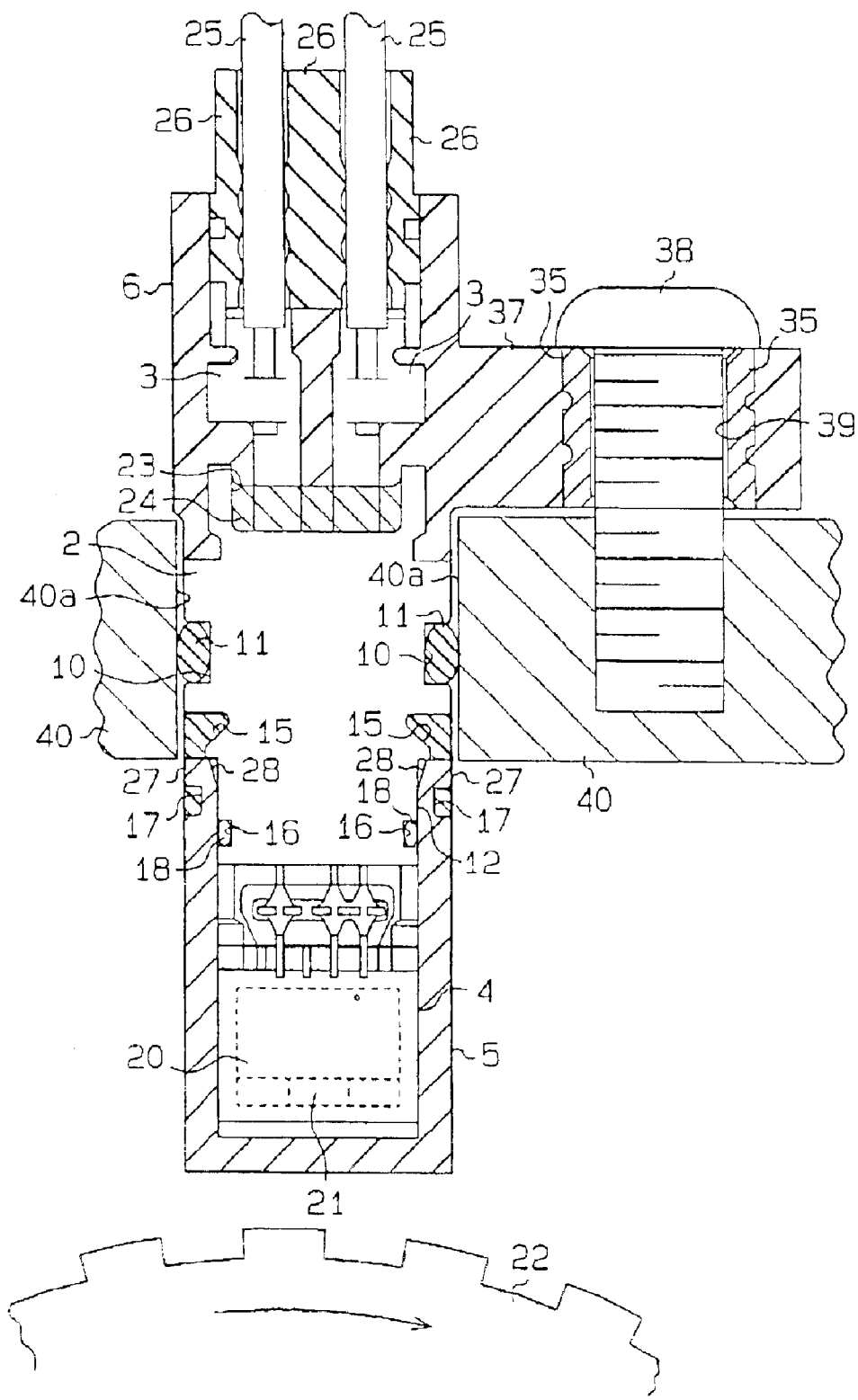
FIG. 5 is cross-sectional view of the rotation detection sensor shown in FIG. 1 in an assembled state.

The magnetic detection element 4 detects the rotation of a rotation member 22 shown in FIG. 5 in a non-contacting manner. The rotation member 22 includes radial slits in the radial direction or a general gear surface on its external or outer periphery. In practice, variations in the magnetic flux density of the magnetic flux generated surrounding the magnet 20 is detected by the detection element 21 under the condition that the magnetic flux density of the magnetic flux generated surrounding the magnet 20 varies based on the rotation of the rotation member 22. It is to be understood that the rotation member 22 can be replaced by a rack for performing a linear motion, instead of the rotation motion of the rotation member 22, to detect the linear motion of the rack by the detection element 21.

The rear end of the terminal 3 protrudes from the rear end of the holder 2. A resin injection portion 23 is provided on the holder 2 surrounding a protruding portion of the terminal 3. The resin injecting portion 23 is injected with a silicon resin 24 serving as a potting member for performing potting sealing.

Several lead wires 25 are electrically connected to the rear end portion of the terminal 3. The lead wires 25 extends from the rear end of the rotation detection sensor 1. A grommet 26 is fitted into, or otherwise provided with respect to, the lead wires 25 for effecting sealing.

Figure 2:
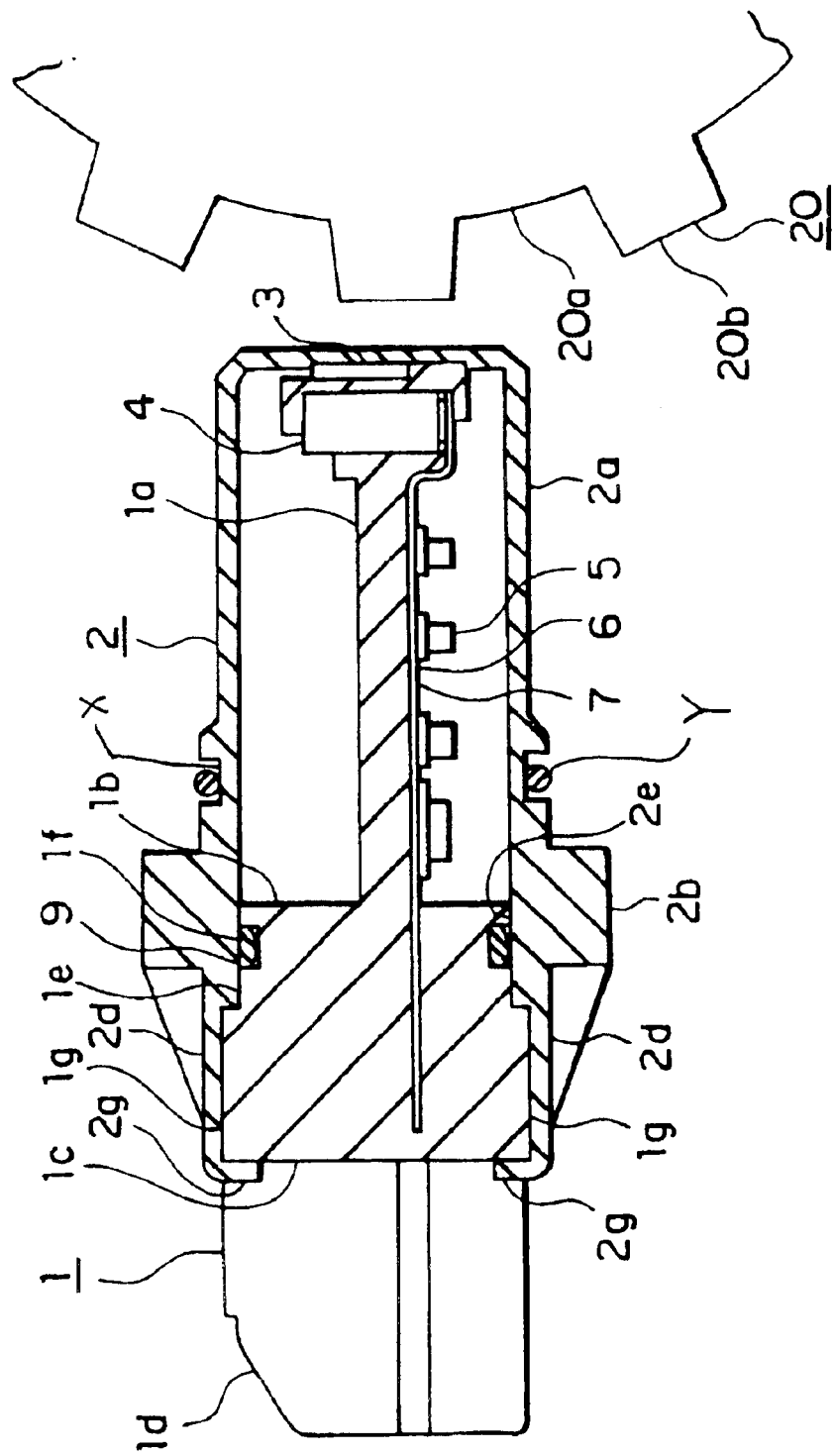
FIG. 2 is a front cross-sectional view of the rotation detection sensor shown in FIG. 1.
Figure 9:
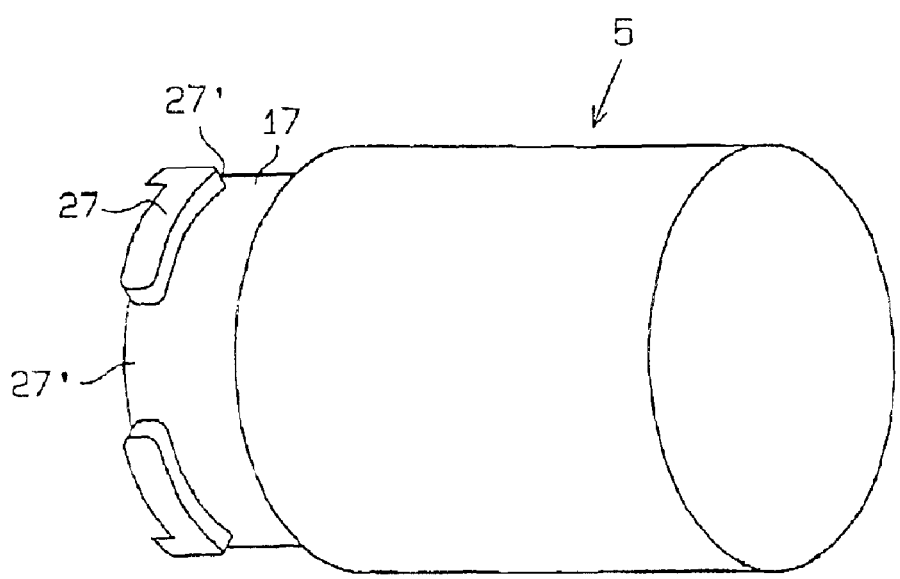
FIG. 9 is a perspective view of the case body forming a part of the rotation detection sensor illustrated in FIG. 1.

The magnet detection element 4 is accommodated in the case body 5. The case body 5 has a bottom wall or bottom end and is made of resin (i.e., PPS). As shown in FIGS. 1, 2, 3 and 9, the case body 5 is formed with the annular case body recess portion 17 which extends in the circumferential direction and is spaced from the open end by a predetermined distance in the forward direction. The depth of the case body recess portion 17 corresponds to approximately one-half the wall thickness of the case body 5 as generally shown in FIGS. 2 and 3. The external diameter of the case body recess portion 17 is formed to be identical to the external diameter of the recess portions 52 on the holder 2. The outer surface of the case body 5 adjacent the open end of the case body 5 is provided with several spaced apart recesses 27' located at a predetermined interval in the circumferential direction to form a plurality of case body projection portions 27. The illustrated embodiment includes four case body projection portions 27. The recesses 27' at the open end of the case body 5 have a depth identical to the depth of the case body recess portion 17. Thus, the case body recess portion 17 is provided as a circumferential groove extending along the entire circumferential direction of the case body 5 and communicating with axially extending grooves constituted by the recesses 27' that open to or communicate with the end of the case body 5 as shown in FIG. 9. The grooves provided in the axial direction are connected to the recesses of the holder 2 on a common cylindrical surface.

As illustrated in FIGS. 2 and 3, the case body 5 is formed with a tapered introduction surface 28 on the rear end portion of the internal peripheral surface. The tapered introduction surface 28 is formed to have a larger internal diameter closer to the rear end portion and a smaller internal diameter farther away from the rear end portion. The open end internal diameter of the introduction surface 28 is greater than the external or outer diameter of the second O-ring 18 that is fitted into the recess 16 in the holder 2. The internal diameter of the case body 5 is smaller than the external or outer diameter of the second O-ring 18 fitted into the recess 16 in the holder 2. Thus, the second O-ring 18 is contracted or compressed by the introduction surface 28 so that the tip end portion of the holder 2 can be easily inserted into the case body 5. In addition, because the open end internal diameter of the introduction surface 28 is greater than the second O-ring 18, the second O-ring 18 is inhibited from being damaged by the open end.

The holder 2 and the case body 5 are engaged with one another via the stopper portion 29. The stopper portion 29 is formed of resin introduced into the annular holder recess portion 13, the case body recess portion 17, the recesses 52 of the holder 2, and the recesses 27' at the open end of the case body 5. The stopper portion 29 is formed to fill the holder recess portion 13 of the holder 2 and to surround the sides of the periphery of the case body projection portions 27 of the case body 5. Thus, the holder projection portion 14 and the case body projection portion 27 are engaged via the stopper portion 29 for performing the detent or engagement between the holder 2 and the case body 5.

The housing 6 includes a flange portion 37 for installing the rotation detection sensor 1 to a predetermined member (e.g., a hydraulic pressure circuit for an automatic transmission). The flange portion 37 is formed with a fastening bore 39 as shown in FIG. 5 for fixing the flange member 37 to a member 40 with a tightening member such as a bolt 38.

Figure 6:
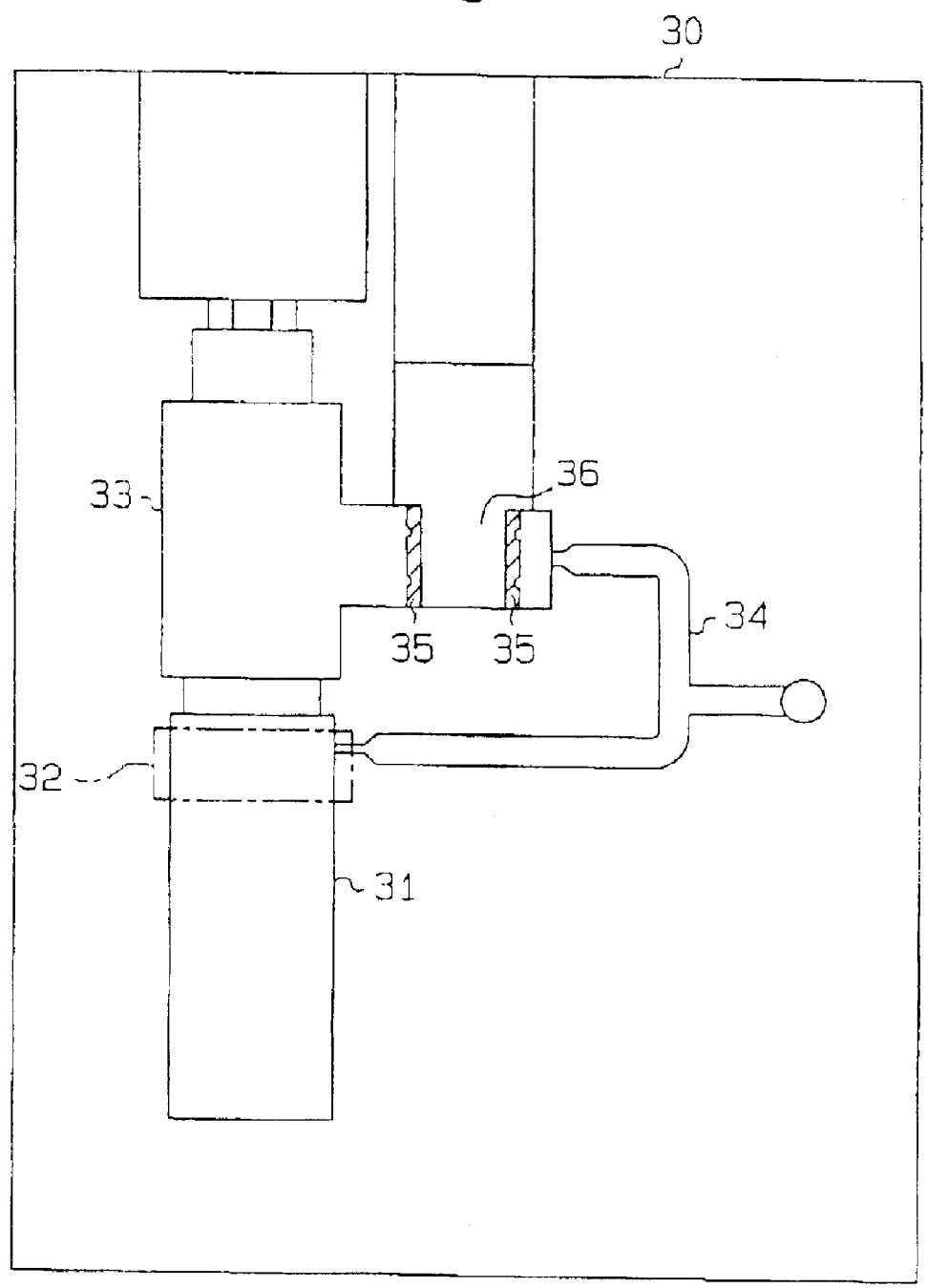
FIG. 6 is a plan view of die for forming a resin portion of the rotation detection sensor shown in FIG. 1.

The housing 6 and the stopper portion 29 are formed by injecting resin (i.e., such as nylon 66) into a die 30 shown in FIG. 6. The die 30 includes a recess portion 31 for accommodating a work (i.e., the assembly formed by the case body 5 and the holder 2, with the latter being inserted in the former), and a runner 34 for supplying the resin to the stopper portion forming portion 32 and a housing forming portion 33. A metal made collar 35 is set in the die 30. The die 30 includes a slide core 36 for preventing the invasion of resin into the collar 35.

The work is fixed in an axial direction via the tip end portion of the case body 5, the first groove 10, and the grommet 26. The work is inserted into the recess portion 31 so that the inclines 15 of the holder 2 are opposed to a gate of the stopper portion forming portion 32. As noted, the position of the work is fixed relative to the resin molding by the tip end portion of the case body 5, the first groove 10, and the grommet 26.

As shown in FIG. 6, the injection of the resin is performed via two runners constituting a forked runner 34. The resin is injected to the stopper portion forming portion 32 of the holder 2 and the case body 5 via one of the runners 34 and is injected to the housing forming portion 33 via the other runner 34.

The stopper portion 29 is formed to overlap the holder 2 and the case body 5. The diameters of the recess portions 52, 27' formed on both the holder 2 and the case body 5 are identical to each other. That is, the recess portion is formed on the common cylindrical surface of the holder 2 and the case body 5 to function as a conduit for introducing the melted resin.

The resin injected into the housing forming portion 33 approximately covers the rear end portion of the holder 2, the terminal 3 projecting from the rear end portion of the holder 2, the lead wires 25, and the grommet 26 having the lead wires 25 therein for forming the housing 6.

The resin injected into the stopper portion forming portion 32 easily (smoothly) prevails to the entire conduit or path (the recesses 13, 17) for introducing the melted resin because the deep construction of the inclines 15 helps to increase the flow performance of the conduit or path for introducing the melted resin. With respect to the formed condition of the stopper portion 29, the radial thickness of the resin forming the stopper portion 29 is approximately the same as the thickness of the case body recess portion 17. Thus, one end face (i.e., the end face facing in the axial direction) of the stopper portion 29 contacts an end face (i.e., the end face facing the stopper portion 29 in the axial direction) of the case body.

Figure 4:
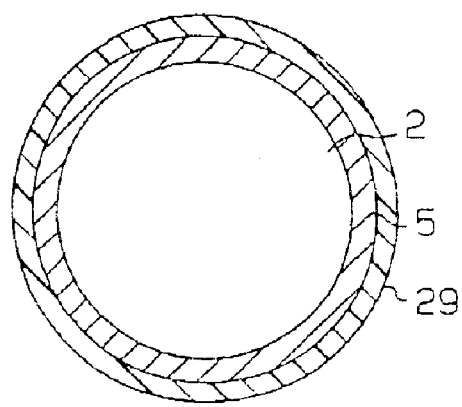
FIG. 4 is a cross sectional view of the rotation detection sensor taken along the section line IV—IV in FIG. 3.

Referring to FIG. 4 and with respect to the forming condition of the stopper portion 29 in which the stopper portion 29 and the case body 5 contact one another, the radial thickness of the resin forming the stopper portion 29 and the radial thickness of the resin or material forming the case body 5 are approximately the same. The resin injected in the die 30 during forming forms the stopper portion 29 and the resin pressure during the forming process is applied to the portion forming the stopper portion 29. Compared to other known devices such as those described above, the dimension which receives the pressure of the resin in the axial direction of the holder 2 during the forming process is extremely small. Accordingly, the force which compresses the holder 2 towards the case body 5 when injecting the resin is small and the holder 2 does not move. The open end of the case body 5 is thus not deformed.

The position of the conduit or path for introducing the melted resin (i.e., the case body recess portion 17 and the holder recess portion 13) is not aligned in the axial direction with the position of the second O-ring 18 provided in the second groove 16 that is positioned between the case body 5 and the tip end portion of the holder 2. Thus, because the portion of the case body 5 contacting the second O-ring 18 (i.e., sandwiching the second O-ring 18 in the second groove 16 of the holder 2) is substantially not deformed when forming the stopper portion 29, a squeezing force applied to the second O-ring 18 is not substantially changed.

The effect of the rotation detection sensor 1 constructed in the foregoing manner is as follows. As shown in FIG. 5, the rotation detection sensor 1 is inserted into an assembling bore 40a of the member 40 so that the magnetic detection element 4 can detect the rotation of the rotation member 22. The sensor 1 is fixed to the member 40 via the bolt 8 inserted into the fastening bore 39 of the flange 37. The first O-ring 11 is located between the internal peripheral surface of the assembling bore 40a and the external peripheral surface of the first groove 10. The first O-ring 11, under the contracted or compressed condition, is press-fitted relative to the internal peripheral surface of the assembling bore 40a and to the external peripheral surface of the first groove 10 by the elastic force thereof.

That is, the assembling bore 40a is sealed by the first O-ring 11. The tip end side of the rotation detection sensor 1 is inserted into oil with high pressure and the rear end side of the rotation detection sensor 1 is exposed to the normal ambient pressure. The oil with high pressure in the member 40 does not leak from the assembling bore 40a. Thus, oil does not enter from the rear end side of the rotation detection sensor 1.

In addition, even when a clearance is formed between the stopper portion 29 and the case body 5 due to the pulsation of the high pressure oil, the oil does not further invade into the rotation detection sensor 1 because the second O-ring 18 is positioned between the case body 5 and the tip end portion of the holder 2, and the squeezing of the second O-ring 18 does not change even during the forming process of the stopper portion 29.

Generally speaking, the portion of the holder 2 extending between and including the first groove 10 and the projection portion 50 constitutes an intermediate portion of the holder, the portion of the holder located on the tip end side of the intermediate portion constitutes the front end portion of the holder, and the portion of the holder located on the opposite side of the intermediate portion constitutes the rear end portion of the holder.

A variety of advantageous results can be achieved in connection with the present invention. For example, because the first O-ring 11 is press-fitted relative to the internal peripheral surface of the assembling bore 40a and the external peripheral surface of the first groove 10 formed on the external peripheral surface of the holder 2 by the elastic force of the first O-ring 11, effective sealing performance by the first O-ring 11 can be achieved. Thus, the sealing by the first O-ring 11 can be performed even when the magnetic detection element 4 detects the rotation of the rotation member 22 under high hydraulic pressure conditions.

By virtue of the second O-ring 18 being press-fitted relative to the internal peripheral surface of the case body 5 and the external peripheral surface of the second groove 16 by the elastic force of the second O-ring 18, effective sealing performance by the second O-ring 18 can be achieved. Thus, the sealing by the second O-ring 18 can be performed even when the magnetic detection element 4 detects the rotation of the rotation member 22 under high hydraulic pressure conditions.

The resin injection portion 23 is provided on the rear end surface of the holder 2 surrounding the projection portion of the terminal 3 for applying a potting sealing in which the silicon resin 24 is the potting member. Thus, sufficient sealing can be performed under the normal pressure condition.

The open end internal diameter of the introduction surface 28 is configured to be greater than the external diameter of the second O-ring 18 fitted into the holder 2, and so the introduction surface 28 of the case body 5 is contacted by the second O-ring 18 when inserting the inserting portion 12 into the case body 5. Thus, because the case body 5 is always able to contact the second O-ring 18 via the surface when inserting the second O-ring 18 into the case body 5, the insertion can be performed without damaging the second O-ring 18.

In addition, the plural inclines 15 are formed between the bottom portions of the holder recess portion 13 and the recesses of the holder 2. The conduit or path for introducing the melted resin is thus provided with smooth inclines. Thus, the flow performance of the resin is increased and the pressure necessary for injecting the resin can be reduced.

Because the second groove 16 is formed on the tip end side of the holder relative to the case body recess portion 17, which corresponds to the conduit for injecting the resin, the deformation of the case body 5 by the molding pressure of the resin can be inhibited or prevented. Thus, the molding pressure is applied away from the location of the O-ring and so the squeezing or sealing ability of the second O-ring 18 can be appropriately ensured.

Because the common recess portion corresponding to the conduit for introducing the melted resin is formed on the common cylindrical surface of the holder 2 and the case body 5, a relatively smooth flow of resin can be achieved. Thus, the resin pressure required for the molding can be reduced.

Because the rear end portion of the case body 5 and the resin have a contact by approximately a half dimension of the thickness of the case body 5, the transmission of the pressure during the resin molding to the case body 5 can be made relatively smooth compared to other known devices such as those mentioned above. This thus inhibits or prevents deformation of the case body 5.

Although the sensor has been described in the context of one embodiment, it is to be understood that variations on the illustrated and described embodiment can be employed. For example, although the first groove 10 for accommodating the first O-ring 11 is provided on the external peripheral surface of the holder 2, the only condition is that the recess portion for accommodating the first O-ring 11 be formed after forming the stopper portion 29 and the housing 6. Thus, for example, the tip end stepped portion of the first groove 10 may be omitted and a first groove for accommodating the first O-ring 11 may be formed by the stopper portion 29 and the holder 2.

Although PPS is used to fabricate the case body 5 for purposes of providing chemical resistance and oil resistance, it is to be understood that nylon 66, nylon 6, and PBT may be used in place of PPS.

Likewise, although PPS is described as being the resin used to post form the housing 6, nylon 66, nylon 6, and PBT may be used instead of PPS.

Although the first and second O-rings 11, 18 are applied as sealing members for the high pressure portion in the foregoing embodiment, the only condition of the sealing member is to maintain the sealing performance under high pressure and so the sealing members are not limited to the illustrated and described O-rings.

In the rotation detection sensor described above and illustrated in the drawing figures, the resin conduit for forming the stopper portion is formed so that the outer side surface of the case body side and the outer side surface of the holder are form a common cylindrical surface. More particularly, the outer side surface of the case body recess portion 17 and the outer side surface of the recesses 52 are positioned on a common cylindrical surface. Thus, a step with respect to the conduit or path for introducing the melted resin is eradicated or eliminated and so the flow performance of the resin is increased and the pressure necessary for injecting the resin can be reduced.

As described above, the rear end surface of the holder is provided with the resin injection portion surrounding the projection portion of the terminal and the potting sealing is applied to the resin injection portion by the potting member. Accordingly, the invasion of the fluid from the normal pressure portion can be prevented.

In addition, the resin is applied in the case body by potting when inserting the detection element into the case body. The rotation detection sensor this exhibits vibration resistance. Also, the invasion of fluid into the sensor can be prevented when the rotation detection sensor is used under the condition that the tip end of the rotation detection sensor is exposed to fluid under high temperature and high pressure. Further, by reducing the pressure applied to the case body during the resin molding of the rotation detection sensor, the defective moldings due to the deformation of the case body can be reduced.

As described above, the rotation detection sensor is configured so that the resin relatively easily flows when supplying the resin during the resin molding operation. Thus, defective moldings such as underfilling can be prevented without applying or utilizing an extremely high pressure.

Also, with the rotation detection sensor described above and illustrated in the drawing figures, the invasion of the fluid entering from the stopper portion into the sensor can be prevented. The deformation of the case body can also be prevented because the pressure of the stopper portion during the resin molding is unlikely applied to the case body positioned on the second groove provided in the holder.

The rotation detection sensor is also constructed so that only the tip end portion relative to the first groove of the holder is operated in the fluid with high pressure. Also, the force of the pressure applied to the case body during the resin molding process is reduced because the force is applied only from the resin formed in the annular conduit for introducing the melted resin.

Because the bottom surface of the recess of the stopper portion opposing the injection opening for injecting the resin therefrom is configured to be relatively deep, the flowing performance of the resin is increased and the melted resin injected from the resin injection opening smoothly prevails into the entire conduit for introducing the melted resin.

Additionally, the sealing performance between the case body and the holder is improved by providing the second groove in the holder and by positioning the second sealing member in the second groove. The pressure is also unlikely to be applied to the case body positioned on the second groove provided in the holder during the resin molding of the stopper portion.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A rotation detection sensor to be installed in a predetermined member for accommodating fluid with high pressure for detecting rotation of a rotation member positioned in the predetermined member comprising:
    a detection element for detecting rotation of the rotation member;
    a holder having a front end portion including a tip end provided with the detection element, a rear end portion, and an intermediate portion;
    a first groove formed on an external peripheral surface of the intermediate portion of the holder;
    a case body accommodating the front end portion of the holder including the detection element;
    a housing covering a part of the rear end portion of the holder; and
    a first sealing member provided in the first groove of the holder.

2. The rotation detection sensor according to claim 1, further comprising:
    at least one recess provided on a rear end of the case body to form a projection portion at the rear end of the case body;
    at least one projection portion provided on the intermediate portion of the holder;
    at least one recess provided on the projection portion of the holder;
    an annular recess provided on the case body;
    an annular recess provided on the intermediate portion of the holder; the annular recess provided on the intermediate portion of the holder and the annular recess provided on the case body being in communication via the recess provided on the rear end of the case body and the recess provided on the projection portion of the holder;
    a stopper formed of resin and positioned in the annular recess of the holder, the stopper engaging the projection portion formed on the rear end of the case body and the projection portion formed on the holder.

3. The rotation detection sensor according to claim 2, wherein part of the annular recess of the holder includes a deeper bottom portion that is deeper than an adjacent part of the annular recess of the holder.

4. The rotation detection sensor according to claim 3, wherein a plurality of deeper bottoms are provided in the annular recess of the holder.

5. The rotation detection sensor according to claim 4, further comprising:
    a second groove formed on the external surface of the front portion of the holder; and
    a second sealing member provided in the second groove for sealing between an internal peripheral surface of the case body and the holder.

6. The rotation detection sensor according to claim 5, wherein the second groove and the second sealing member are positioned on the front portion of the holder at a position between the stopper portion and the detection element.

7. A rotation detection sensor according to claim 3, further comprising:
a second groove formed on the external surface of the front portion of the holder; and
a second sealing member provided in the second groove for sealing between an internal peripheral surface of the case body and the holder.

8. The rotation detection sensor according to claim 7, wherein the second groove and the second sealing member are positioned on the front portion of the holder at a position between the stopper portion and the detection element.

9. A rotation detection sensor according to claim 2, further comprising:
a second groove formed on the external surface of the front portion of the holder; and
a second sealing member provided in the second groove for sealing between an internal peripheral surface of the case body and the holder.

10. The rotation detection sensor according to claim 9, wherein the second groove and the second sealing member are positioned on the front portion of the holder at a position between the stopper portion and the detection element.

11. A rotation detection sensor according to claim 1, further comprising:
a second groove formed on the external surface of the front portion of the holder; and
a second sealing member provided in the second groove for sealing between an internal peripheral surface of the case body and the holder.

12. The rotation detection sensor according to claim 11, wherein the second groove and the second sealing member are positioned on the front portion of the holder at a position between a stopper portion and the detection element.

13. The rotation detection sensor according to claim 1, further comprising:
at least one axially extending recess provided on a rear end portion of the case body;
at least one projection portion provided on the intermediate portion of the holder;
at least one recess provided on the projection portion of the holder;
an annular recess provided on the case body;
an annular recess provided on the intermediate portion of the holder;
a stopper formed of resin, the stopper being positioned in the annular recess of the holder, in the at least one axially extending recess on the rear end portion of the case body, in the at least one recess provided on the projection portion of the holder and in the annular recess provided on the case body.

14. The rotation detection sensor according to claim 1, wherein the first sealing member provides a seal between the holder and a portion of the predetermined member surrounding the holder.

15. A rotation detection sensor to be installed in a predetermined member for accommodating fluid with high pressure for detecting rotation of a rotation member positioned in the predetermined member comprising:
a detection element for detecting rotation of the rotation member;
a holder having a front end portion including a tip end provided with the detection element, a rear end portion, and an intermediate portion;
a case body accommodating the front end portion of the holder including the detection element;
a housing covering a part of the rear end portion of the holder;
a first groove formed on an external peripheral surface of the intermediate portion of the holder, the first groove being spaced from an end of the case body in a direction towards the rear end portion of the holder; and
a first sealing member provided in the first groove of the holder.

16. The rotation detection sensor according to claim 15, wherein the first sealing member provides a seal between the holder and a portion of the predetermined member surrounding the holder.

* * * * *